May 14, 1963 G. J. HECHT ETAL 3,089,382
METHOD AND APPARATUS FOR ANALYZING FLUIDS
Original Filed July 1, 1957 3 Sheets-Sheet 1

INVENTORS:
G. J. HECHT
V. N. SMITH
BY: J. H. McCarthy
THEIR AGENT

May 14, 1963  G. J. HECHT ETAL  3,089,382
METHOD AND APPARATUS FOR ANALYZING FLUIDS
Original Filed July 1, 1957  3 Sheets-Sheet 3

INVENTORS:
G. J. HECHT
V. N. SMITH
BY: J. H. McCarthy
THEIR AGENT

United States Patent Office 3,089,382
Patented May 14, 1963

3,089,382
METHOD AND APPARATUS FOR ANALYZING FLUIDS
George J. Hecht, El Cerrito, and Vigo N. Smith, San Leandro, Calif., assignors to Shell Oil Company, New York, N.Y., a corporation of Delaware
Continuation of application Ser. No. 669,161, July 1, 1957. This application May 26, 1959, Ser. No. 816,360
8 Claims. (Cl. 88—14)

This invention relates to the analysis of heteratomic fluid mixtures, and pertains more particularly to the method and apparatus for continuously effecting such analysis, automatically recording the results thereof, and/or automatically controlling the composition, flow rate or other parameters of said fluid or mixtures thereof.

The system of the present invention preferably makes use of the principal of selective light absorption and is particularly suitable for determining, recording and/or controlling the proportions of two or more components in a fluid stream.

To date infrared spectroscopy has been confined mainly to the spectral region between 2.5 and 15 microns. This has been mainly due to the fact that an infrared analyzer capable of measuring the spectral region below 2.5 microns is a very complex instrument with a complicated optical system. For the purpose of describing the present invention, the spectral region which is arbitrarily taken as from about 1.0 to 2.6 microns will be referred to as the near infrared region.

The near infrared region has not been of great interest to spectroscopists in the past because most of the absorption bands in this region are overtones of the fundamental frequencies of higher infrared regions. There has been increasing interest in the near infrared as it has been found that the near infrared spectral region has become attractive for use in continuous analyzing systems. This is mainly due to the fact that the sample cells that can be used in a near infrared analyzer may be many times larger than those used in the present infrared analyzers and hence are more practical in plant instruments. In addition, the light source used in the present near infrared system is an ordinary incandescent lamp while the window materials of the sample cell are either glass or fused quartz.

It is therefore a primary object of this invention to provide a method and apparatus for carrying out analyses of fluid bodies having two or more components. Specifically, the present method and apparatus may be employed in the measurement of water in various organic liquids, for example, isopropyl alcohol; the measurement of ketones in alcohols or hydrocarbons; the measurement of alcohols in ketones or hydrocarbons; the measurement of aromatics in hydrocarbons; the measure of olefins in hydrocarbons; etc.

A further object of this invention is to provide a radiation analyzer of high sensitivity, stability and discriminating power for analyzing multi-component fluid streams.

Another object of the present invention is to provide a simple and rugged radiation analyzer employing a single optical path so as to make the readings optically stable and thus superior to the conventional double beam analyzers wherein contaminating materials may collect unequally on the windows of the sample cells.

These and other objects of the present invention will be understood from the following description taken with reference to the attached drawings, wherein.

Figure 1:
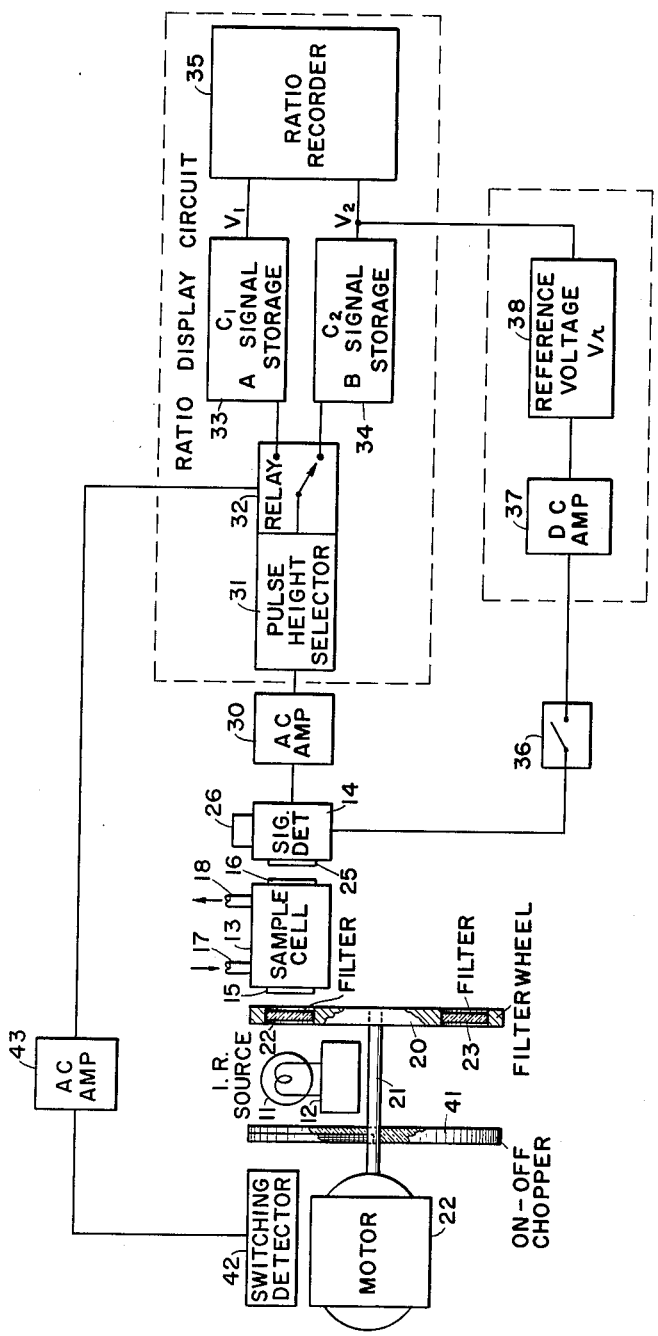
FIGURE 1 is a diagrammatic view indicating one general arrangement of the parts forming the present system.

Referring to FIGURE 1, reference 11 indicates a source of radiation such as a light or lamp having a filament of suitable alloys heated to a proper temperature to emit a desired spectrum of rays when electrical energy is supplied to said lamp. If the present multi-wave length analyzer is to be used as a near infrared analyzer the light source may be an automobile head-light type source. On the other hand, an ultraviolet lamp may be employed if the present radiation system is to be used as an ultraviolet analyzer. Filament voltage of the light source may be regulated by a suitable transformer 12.

Arranged in front of the lamp 11 is a sample or absorption cell 13 and a radiation detector, for example a photo-conductive detector 14. The cell is preferably made of a suitable metal and is provided with a pair of transparent windows 15 and 16 which are arranged in a line between the light source 11 and the detector 14.

Any material transparent to radiation of the wave length being employed may be used to make the windows 15 and 16, such as glass, quartz, lithium fluoride, sodium chloride, silver chloride, etc., the choice of any particular material being governed by the region of the spectrum in which it is desired to operate. When operating in the near infrared spectrum from 1.0 to 2.6 microns, glass or quartz is satisfactory. Lithium fluoride windows when used in a radiation analyzer, would cut off any radiation having a wave length of more than 6.5 microns, while silver chloride could be used for wave lengths up to about 20 microns. The sample cell 13 is also provided with fluid inlet and outlet means 17 and 18, respectively by which a sample of fluid to be analyzed may be circulated through the cell 13.

Interposed between the light source 11 and the detector 14, on either side of the sample cell 13, is a shutter mechanism comprising a disc 20 rotatably mounted on a shaft 21 driven by an electric motor 22. A high speed motor which rotates at, say, 3600 r.p.m. is preferably used if it is desired that the radiation analyzer should possess very rapid response to changes in a fluid stream being analyzed. Fixedly mounted in the rotating disc 20 are two or more multilayer interference filters.

Multilayer interference filters normally comprise a plurality of layers of a substance, for example, germanium, tellurium, etc. which are alternately stacked with layers of another substance, such as cryolite, on a glass plate or any other transparent dielectric plate.

The interference-type filters 22 and 23, known as narrow pass band filters, provide single wave length selection by filtering a source of radiant energy so as to reject all radiation except that in a small pass band centered about a desired wave length. The particular filter used in any analyzer depends upon the wave length that is being analyzed. The filters 22 and 23 are for different wave lengths, as will be described hereinbelow.

The photoconductive detector cell 14 preferably has its photosensitive element made of lead sulfide when the radiation analyzer of the present invention is being employed as a near infrared analyzer. Detector cells of this type are sold under the trade name of "Ektron" by Eastman Kodak Co. of Rochester, N.Y. A 10 x 10 millimeter square lead sulfide cell is mounted in a sealed unit 14 having a quartz window 25. The cell 14 is in contact with a metal block-type heater 26 provided with a thermostat (not shown) for controlling the temperature of the detector to ±1° C., preferably at a temperature higher than the ambient temperatures at the location where the analyzer is being used. In plant locations this temperature may be of the order of 55° C. If it is desired to study wave lengths higher than the near infrared spectrum, detector cells made of materials other than lead sulfide may be used, such as for example, lead telluride, lead selenide, etc. For an ultraviolet analyzer the detector could be a photomultiplier—the high output of which would eliminate the need for amplifier 30. The detector 14 is electrically connected through an amplifier 30 to a ratio display circuit comprising a pulse height selector 31, a switching relay 32, and thence through one of two capacitors 33 or 34 to a ratio recorder 35. If desired, an automatic gain control loop may be employed between the detector 14 and the ratio display circuit. The automatic gain control loop comprises a switch 36, a D.C. amplifier 37 and a means for providing a reference voltage 38 such as a battery or the equivalent thereof.

Suitable means are provided for actuating the switching relay 32 synchronously with the movement of the filters 22 and 23 past the light source 11 so that the detector 14 is connected through first one capacitor 33 and then the other capacitor 34 to the ratio recorder 35 as first one filter 23 and then the other filter 22 passes the sample cell 13. One possible type of actuating means is illustrated in FIGURE 1 which comprises a rotating on-off chopper disc 41 which may be in the form of a semicircular opaque plate fixedly secured to the rotating shaft 21. However, better balance on the shaft is obtained when the chopper 41 is a transparent disc, preferably made of a plastic with a portion of the area of said disc, say one-half its area, painted black.

Thus, when the chopper disc 41 is interposed between the light source 11 and a second detector 42, the black portion of the disc cuts off light from the detector 42 during a portion of each rotation of disc 41 which rotates synchronously with filter disc 20. The switching detector 42 may be another lead sulfide detector similar to the signal detector 14 or may be of any type of photoelectric cell which is connected through an amplifier 43 to the switching relay 32 so as to actuate the moveable contact of said relay 32 from one position to the other.

It is realized that any other suitable means may be used to actuate the switching relay 32 as long as it operates synchronously with the rotation of the filter disc 20. For example, in the most simple form, two pegs could be mounted on the filter disc 20 to mechanically actuate the switching relay 32 from one position to the other on each rotation of the disc 20.

A lead sulfide photoconductive detector 14 is employed when the present radiation analyzer is to be used in the near infrared range since a lead sulfide detector is rugged and highly sensitive at wave lengths from the visible to about 2.8 microns. It is necessary, however, to provide means for eliminating the effect of the large temperature coefficient of the lead sulfide detector, which affects the stability of the detector. In order to eliminate the effects of variation in detector sensitivity, self-compensation is built into the present system in the form of two-beam operation with a single beam detector. With this system, the ratio of energies transmitted by the sample through filters of two selected wave lengths may be detected and serves as a measure of the amount of component for which a fluid stream is being analyzed.

The wave length (A) of one filter is selected at a point where the component to be measured absorbs strongly, while the second or reference wave length (B) of the second filter is chosen where all components are relatively weak absorbers. For example, when it is desired to analyze for the presence of water in isopropyl alcohol, the measuring wave length of one filter 23 is 1.95 microns while the reference wave length of the other filter 22 is 1.66 microns. Alternatively, the filters 22 and 23 may be chosen so that the absorption of the interferring component of the liquid beam analyzed is equal at the two wave lengths.

In operation, the motor 22 turns shaft 21 causing disc 20 and filters 22 and 23 to rotate at high speed between the light source of fixed intensity 11 and the detector 14. A sample of the fluid to be analyzed is circulated through, or held stationary in, sample cell 13. Light from the incandescent light source 11 passes as a single beam through the chopper wheel 20 when one of the two filters 22 or 23 is in register between the source 11 and the sample cell 13. Light passing through the sample cell 13 enters window 25 and falls on the detector 14. The detector receives alternate pulses of light representing first the transmission of radiated energy by the sample at one wave length (A) and then at the other wave length (B). These pulses of transmitted energy, which represent the individual total energies of the individually transmitted radiations at the selected wave lengths, are converted to voltage pulses by the detector 14 and are then amplified by amplifier 30 and sorted out by the pulse selector circuit or pulse height selector 31.

Figure 2:
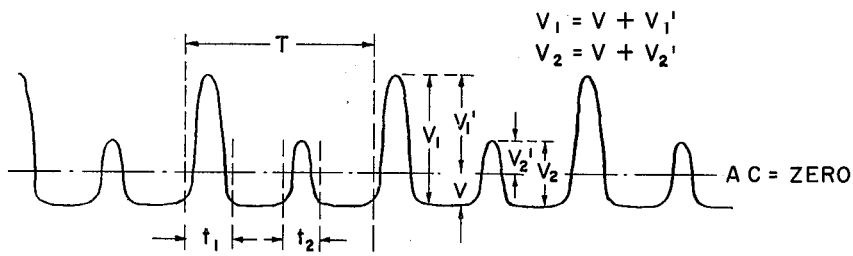
FIGURE 2 illustrates one possible wave form produced by the present radiation analyzer.

As the light between the incandescent source 11 and the switching detector 42 is cut by the on-off chopper disc 41 rotating at the same speed as disc 20, the signal put out by said detector 42 is amplified by amplifier 43 and serves to operate switching relay 32 for switching it from one position to the other. The pulse height selector 31, switching detector 42 and switching relay 32 operate to charge the capacitors 33 and 34 to voltages $V_1$ and $V_2$ which are representative of the two series of pulses transmitted by the sample at wave lengths (A) and (B), respectively, as illustrated in FIGURE 2. The ratio of the voltages $V_1$ and $V_2$ on the storage capacitors 33 and 34 is then recorded on any conventional potentiometer recorder. The recorded ratio of these voltages is a measure of the amount of component present in the fluid stream for which said fluid stream is being analyzed.

Figure 3:
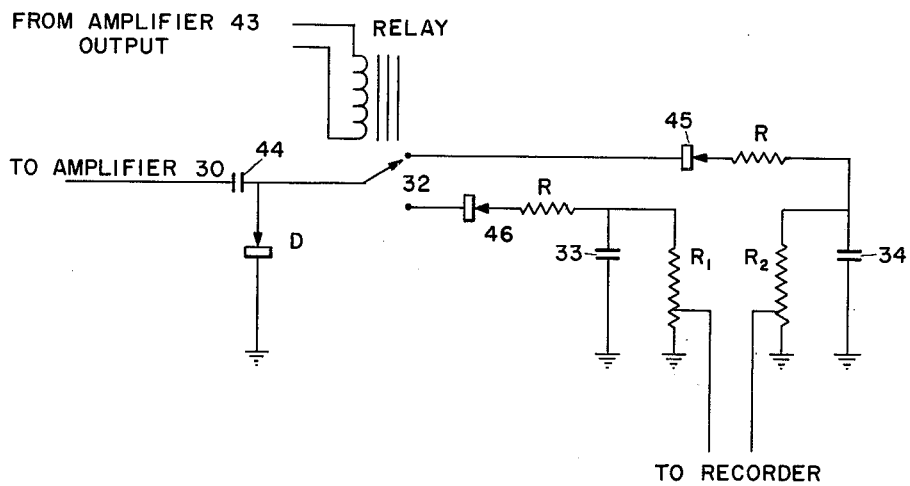
FIGURE 3 is a circuit diagram of the basic pulse height selector and storage circuit used with the present analyzer.

The signal wave form put out by the detector 14 has the character shown in FIGURE 2 wherein the peak pulse heights $V_1$ and $V_2$ are proportional to the total intensities of the radiant energy transmitted at the signal wave length and the reference wave length, respectively. The basic circuit which performs the operations of pulse selection, peak rectification and storage is shown in FIGURE 3. Relay 32 having switch contacts or other switching devices, such as vacuum tubes, transistors, etc., gated by the switching detector 42 in FIGURE 1 connects capacitor 44 to capacitor 34 through diode 45 during time $t_1$ (FIGURE 2) and capacitor 44 to capacitor 33 through diode 46 during time $t_2$. The times $t_1$ and $t_2$ may vary by almost half the total repetition rate T as long as the peaks of the pulses occur during connection to the appropriate capacitor. Capacitor 44 will then charge to the average peak negative voltage V (FIGURE 2) and 34 to $V+V_1'=V_1$ and 33 to $V+V_2'=V_2$. Diodes 45 and 46 can be vacuum tubes or crystal junction types.

Thus, by use of the ratio display circuit the present radiation analyzer is provided with a high degree of stability despite drifting sensitivity of the detector 14 due to changes in temperature. If desired, in order to maintain the operation of the analyzer within a reasonable band of amplitudes, the voltage $V_2$ from the capacitor 34 may be compared with a reference voltage $V_r$ obtained from element 38 and the difference of the two voltages is amplified by amplifier 37, the signal output of which is the bias supply for the detector 14, thus providing automatic gain control to hold voltage $V_2$ constant. The automatic gain control feature permits operation of the analyzer which is independent of large changes in instrument parameters such as lamp brightness, detector cell temperature, window clearness, absolute tube gain, etc. The ratio of the two voltages, which are representative of transmissions at wave lengths A and B, depends only on, and is a true measure of, the concentration of the desired sample component. The incorporation of automatic gain control to the system also increases the range of total intensity over which the analyzer will operate. This feature also permits relaxation of the linearity requirements of the signal amplifier 30.

Figure 5:
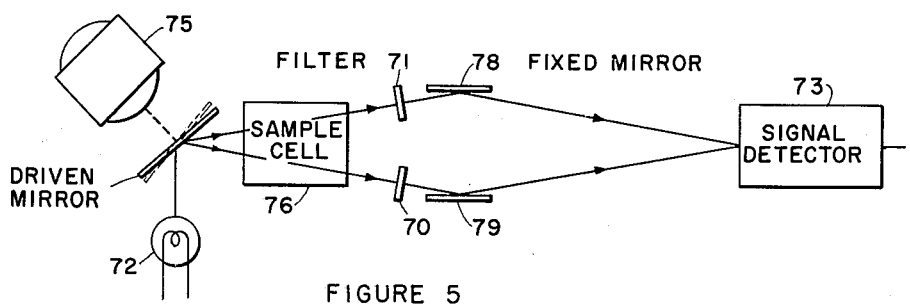
FIGURES 4 and 5 are views of alternative arrangements of the detection portion of the present system.
Figure 4:
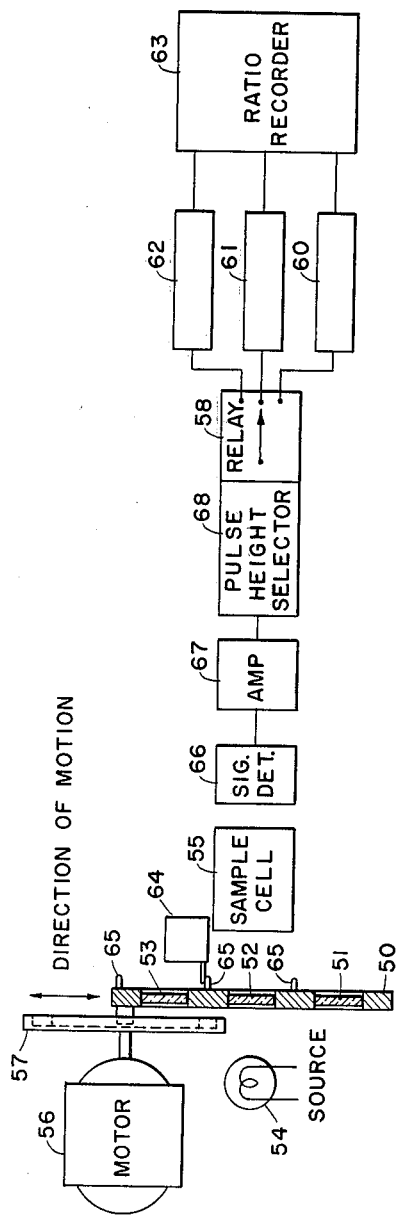

Alternate arrangements of the detection portion of the present system are shown in FIGURES 4 and 5. In FIGURE 4 a shuttle-type filter holder 50, having three filters 51, 52 and 53 mounted therein, is arranged for sliding movement in a direction normal to a line between the radiation source 54 and the sample cell 55. Any suitable type of pneumatic, hydraulic or electrical motor 56 is operatively connected to the holder 50 (as shown by broken line 57) to move the holder back and forth so that one filter at a time is in register with said sample cell 55. The holder 50 may be provided with means for actuating relay 58 which has a number of contact points equal to the number of channels in the system. In FIGURE 4 a three-channel system is illustrated which is provided with three filters 51, 52, 53, a three-point relay 58 and three signal storage capacitors 60, 61 and 62, the latter being electrically-connected to a ratio recorder 63 adapted to compare any pair of signals and at least the signal through the reference filter with each of the other two signals through the other filters. Relay 58 is actuated by any means responsive to movement of the holder 50, as for example, by a switch 64 which is actuated by pegs 65 on the holder 50. The signal detector 66, amplifier 67 and pulse height selector 68 are of the same types described with regard to FIGURE 1. If desired in place of the ratio recorder 63, the voltages on the capacitors 60, 61, 62 may be connected to a circuit for giving indications proportional to the total intensities of the rays received by the detector 66.

Another arrangement of filters is shown in FIGURE 5 wherein a pair of filters 70 and 71 are shown as fixedly mounted and are moved in and out of the optical path between the light source 72 and a signal detector 73 by altering the optical path to pass through first one filter 70 and then the other filter 71. The radiated energy path from the light source 72 is directed to a continually moving pivotally-mounted mirror 74 which is actuated by suitable motor means 75. In one position of the mirror, the optical path is reflected by mirror 74 through the sample cell 76, through filter 71 to be reflected off a fixed mirror 78 into the signal detector 73. A second fixed mirror 79 is employed when the optical path passes through filter 70. If desired, the filters 70 and 71 and the fixed mirrors 78 and 79 may be positioned on the other side of the sample cell 76.

This application is a continuation of U.S. patent application Serial No. 669,161, filed July 1, 1957, now abandoned.

We claim as our invention:

1. The method of analyzing a sample stream for the presence of a component therein capable of absorbing electromagnetic radiation of selected wave lengths, said method comprising directing a single beam of electromagnetic waves radiated from a radiation source of fixed intensity through said sample stream, said beam of radiation containing wave lengths within a preselected band which are absorbed by the component under analysis, alternately filtering and blocking said beam to permit the passage of a narrow band of wave lengths centered on a selected reference wave length of said radiation beam, at which wave length there is a reduced amount of absorption, subsequently filtering said original beam a second time to permit passage of a second narrow band of wave lengths centered on a second selected wave length of said radiated beam, said first selected wave length varying substantially from said second selected wave length, and measuring the ratio of the individual total energies of the individually transmitted radiations at the two selected wave lengths, which ratio is indicative of the component for which said sample stream is being analyzed.

2. The method of analyzing a sample stream for the presence of at least two components therein capable of absorbing electromagnetic radiation of selected wave lengths, said method comprising directing a single beam of electromagnetic waves radiated from a light source of fixed intensity through said sample stream, said beam of radiation containing wave lengths within a preselected band which are absorbed by the component under analysis, alternately filtering and blocking said beam a first time to permit the passage of a narrow band of wave lengths centered on a selected reference wave length of said radiation beam, subsequently filtering said original beam to permit passage of a number of narrow bands of wave lengths centered on an equal number of selected wave lengths of said radiated beam, said number of bands and selected wave lengths being at least equal in number to the number of components for which the sample stream is being analyzed, and measuring the ratio of the individual total energies of the individually transmitted radiations at each selected wave lengths to the reference wave length.

3. A radiation analyzing system comprising light source means of fixed intensity for radiating a spectrum along a single optical path, an absorption cell positioned in said path, means for admitting to said cell means a fluid mixture to be analyzed, windows in said cell aligned to permit the rays traveling along said path to traverse said cell, radiation detector means arranged in the optical path of said light source with said absorption cell to receive the rays traversing said cell and put out an electrical signal proportional thereto, at least two narrow band pass filters mounted at a point between the light source and the detector, said filters being adapted to transmit rays of different wave lengths, means for altering the relative position of said optical path and said filters whereby said rays of said optical path pass through one of said filters at a time, light-blocking means positioned between said filters and mounted for movement into and out of the optical path alternately with the filters, and total intensity measuring circuit means electrically connected to said detector for giving indications proportional to the ratio of individual total intensities of said rays received by said detector means.

4. A radiation analyzing system comprising light source means of fixed intensity for radiating a beam of electromagnetic waves along a single optical path, an absorption cell positioned in said path, means for admitting to said cell means a fluid mixture to be analyzed, windows in said cell aligned to permit the rays traveling along said path to traverse said cell, a radiation detector arranged in the optical path of said light source with said absorption cell to receive the rays traversing said cell and put out an electric signal proportional thereto, window means in said detector for admitting rays thereinto, at least two filters mounted for alternate movement into and out of the optical path at a point between the light source and the detector, each of said filters being adapted to transmit rays of a narrow band of wave lengths centered about a preselected wave length, said preselected wave lengths of said filters varying substantially from each other, light-blocking means positioned between said filters and mounted for movement into and out of the optical path alternately with the filters, and total intensity measuring circuit means electrically connected to said detector for giving indications proportional to the ratio of individual total intensities of said rays received by said detector.

5. A radiation analyzing system comprising light source means of fixed intensity for radiating a beam of electromagnetic waves along a single optical path, an absorption cell positioned in said path, inlet and outlet means for circulating through said cell means a fluid mixture to be analyzed, windows in said cell aligned to permit the electromagnetic waves traveling along said paths to traverse said cell, a photoconductive detector arranged in the optical path of said light source with said absorption cell to receive the waves traversing said cell and put out an electric signal proportional thereto, window means in said detector for admitting waves thereinto, at least two filters adapted to transmit waves of a narrow band of wave lengths centered about a preselected wave length, said preselected wave length of one filter varying substantially from the preselected wave length of other filters, means for alternately moving said filters one at a time into and out of the optical path at a point between the light source and the detector, light-blocking means positioned between said filters and mounted for movement into and out of the optical path alternately with the filters, and total intensity measuring circuit means electrically connected to said detector for measuring and indicating the ratio of the individual total energies of the transmitted waves at the wave lengths of any pair of filters.

6. A radiation analyzing system comprising light source means for radiating a beam of electromagnetic waves along a single optical path, an absorption cell positioned in said path, inlet and outlet means for circulating through said cell means a fluid mixture to be analyzed, windows in said cell aligned to permit the electromagnet waves traveling along said paths to traverse said cell, a photoconductive detector arranged in the optical path of said light source with said absorption cell to receive the waves traversing said cell and put out an electric pulse whose maximum height is proportional to the intensity of the received radiation, window means in said detector for admitting waves thereinto, at least two multilayer interference filters adapted to transmit waves of a narrow band of wave lengths having a preselected wave length in the center thereof, said preselected wave length of one filter varying substantially from the preselected wave length of the other filter, means for alternately moving said filters one at a time into and out of the optical path at a point between the light source and the detector, light-blocking means positioned between said filters and mounted for movement into and out of the optical path alternately with the filters, and measuring circuit means electrically connected to said detector for measuring and indicating the ratio of pulse heights of the transmitted waves at the wave lengths of the two filters, said circuit means including a pulse height selector means for separating the signals of one pulse height from the signals of the other pulse heights, means for measuring the separated pulse heights, and means for comparing the separated measured pulse heights.

7. A radiation analyzing system comprising light source means of fixed intensity for radiating a spectrum along a single optical path, an absorption cell positioned in said path, means for admitting to said cell means a fluid mixture to be analyzed, windows in said cell aligned to permit the rays traveling along said path to traverse said cell, radiation detector means arranged in the optical path of said light source with said absorption cell to receive the rays traversing said cell and put out an electrical signal proportional thereto, at least two narrow band pass filters mounted at a point between the light source and the detector, said filters being adapted to transmit rays of different wave lengths, means for altering the relative position of said optical path and said filters whereby said rays of said optical path pass through one of said filters at a time, light-blocking means positioned between said filters and mounted for movement into and out of the optical path alternately with the filters, and total intensity measuring circuit means electrically connected to said detector for giving indications proportional to the individual total intensities of said rays received by said detector means.

8. A radiation analyzing system comprising light source means of fixed intensity for radiating a beam of electromagnetic waves along a single optical path, an absorption cell positioned in said path, means for admitting to said cell means a fluid mixture to be analyzed, windows in said cell aligned to permit the rays traveling along said path to traverse said cell, a radiation detector arranged in the optical path of said light source with said absorption cell to receive the rays traversing said cell and put out an electric signal proportional thereto, window means in said detector for admitting rays thereinto, at least two filters mounted for alternate movement into and out of the optical path at a point between the light source and the detector, each of said filters being adapted to transmit rays of a narrow band of wave lengths centered about a preselected wave length, said preselected wave lengths of said filters varying substantially from each other, light-blocking means positioned between said filters and mounted for movement into and out of the optical path alternately with the filters, and total intensity measuring circuit means electrically connected to said detector for giving indications proportional to the individual total intensities of said rays received by said detector.

References Cited in the file of this patent
UNITED STATES PATENTS

| | | |
|---|---|---|
| 1,840,500 | Geffcken et al. | Jan. 12, 1932 |
| 2,648,253 | Sweet | Aug. 11, 1953 |
| 2,764,692 | Miller | Sept. 25, 1956 |
| 2,774,277 | Mochler | Dec. 18, 1956 |
| 2,775,160 | Foskett et al. | Dec. 25, 1956 |

FOREIGN PATENTS

| | | |
|---|---|---|
| 466,113 | Canada | June 27, 1950 |